(12) United States Patent
Chang et al.

(10) Patent No.: US 9,142,836 B2
(45) Date of Patent: Sep. 22, 2015

(54) ANODE FOR SECONDARY BATTERY

(71) Applicant: LG CHEM, LTD., Seoul (KR)

(72) Inventors: Sung-Kyun Chang, Daejeon (KR);
WonSeok Chang, Yuseong-gu (KR);
JungMin Han, Seoul (KR); Hong Kyu Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/735,242

(22) Filed: Jan. 7, 2013

(65) Prior Publication Data

US 2013/0130118 A1 May 23, 2013

Related U.S. Application Data

(63) Continuation of application No. PCT/KR2011/005189, filed on Jul. 15, 2011.

(30) Foreign Application Priority Data

Jul. 16, 2010 (KR) .................. 10-2010-0068813

(51) Int. Cl.
*H01M 4/13* (2010.01)
*H01M 4/583* (2010.01)
*H01M 4/133* (2010.01)
*H01M 4/36* (2006.01)
*H01M 4/587* (2010.01)
*H01M 4/62* (2006.01)

(52) U.S. Cl.
CPC .............. *H01M 4/583* (2013.01); *H01M 4/133* (2013.01); *H01M 4/364* (2013.01); *H01M 4/366* (2013.01); *H01M 4/587* (2013.01); *H01M 4/625* (2013.01); *Y02E 60/122* (2013.01)

(58) Field of Classification Search
CPC ....................................... H01M 4/583
USPC ....................................... 429/231.8
See application file for complete search history.

(56) References Cited

U.S. PATENT DOCUMENTS 8,372,373 B2 * 2/2013 Nishimura et al. ........... 423/448
2010/0273058 A1 10/2010 Lee et al.

FOREIGN PATENT DOCUMENTS

| KR | 1999-0076064 A | 10/1999 |
|---|---|---|
| KR | 2001-0054904 A | 7/2001 |
| KR | 2002070763 A * | 9/2002 |
| KR | 10-2004-0003738 A | 1/2004 |
| KR | 10-2007-0034224 A | 3/2007 |
| KR | 10-2007-0113066 A | 11/2007 |
| KR | 10-2008-0086224 A | 9/2008 |

OTHER PUBLICATIONS

International Search Report for PCT/KR2011/005189 mailed on Feb. 23, 2012.

* cited by examiner

*Primary Examiner* — Jane Rhee
(74) *Attorney, Agent, or Firm* — Birch, Stewart, Kolasch & Birch, LLP

(57) ABSTRACT

Disclosed is an anode for secondary batteries comprising a combination of an anode active material having a relatively low charge/discharge voltage and a relatively low hardness (A) and an anode active material having a relatively high charge/discharge voltage and a relatively high hardness (B), wherein the anode active material (A) is surface-coated with carbon having a high hardness or a composite thereof, and a particle size of the anode active material (B) is smaller than a size of a space formed by the anode active materials (A) arranged in a four-coordination. The anode provides an electrode that prevents lithium precipitation caused by overvoltage, improves ionic conductivity as well as electric conductivity and exhibits superior capacity.

15 Claims, No Drawings

ANODE FOR SECONDARY BATTERY

CROSS REFERENCE TO RELATED APPLICATIONS

This non-provisional application is a Continuation of International Application No. PCT/KR2011/005189 filed on Jul. 15, 2011, which claims the benefit of Patent Application No. 10-2010-0068813 filed in the Republic of Korea on Jul. 16, 2010. The entire contents of all of the above applications are hereby incorporated by reference.

TECHNICAL FIELD

The present invention relates to an anode for secondary battery. More specifically, the present invention relates to an anode for secondary batteries comprising a combination of an anode active material having a relatively low charge/discharge voltage and a relatively low hardness (A) and an anode active material having a relatively high charge/discharge voltage and a relatively high hardness (B), wherein the anode active material (A) is surface-coated with carbon having a high hardness or a composite thereof, and a particle size of the anode active material (B) is smaller than a size of a space formed by the anode active materials (A) arranged in a four-coordination.

BACKGROUND ART

In accordance with depletion of fossil fuels and environmental impact problems, many researchers actively concentrate on development of alternative energy. Secondary batteries are also intensively researched in a variety of fields as an alternative energy. The battery field expands to conventional portable devices as well as batteries for automobiles and batteries for power storage.

Representative components constituting the battery include a cathode, an anode, an electrolyte, a separator and the like. Of these, the components having the greatest effects are the cathode and the anode in which an electrochemical reaction substantially occurs.

In particular, a lithium secondary battery uses lithium (Li), as can be seen from the name, and has high energy density and is light in weight, but is disadvantageously dangerous in that it readily produces dendrites. Specifically, during charging, electricity is stored through transfer of Li ions from the cathode to the anode. In this process, at an initial charging stage, Li ions are supplied from the cathode through an electrolyte to the anode and polarization occurs at the interface between respective materials, thus causing overcharge. At this time, movable ions are insufficient as compared to flowing current and Li is thus precipitated due to overvoltage. The lithium precipitation is caused by movement of lithium ions as well as electric resistance and movement of ions is closely related to porosity of electrodes or the like. As porosity increases, mobility of Li ions increases, but electric contact decreases. Accordingly, balance between porosity and mobility of Li ions is required, but is considerably difficult. In particular, disadvantageously, high porosity inevitably entails low energy density. In this regard, a first attempt to commercialize a secondary battery using a Li-metal as an anode was failed due to safety problems.

At present, a graphite-based material enabling charge/discharge of Li is generally used for an anode. However, this graphite-based anode active material has a considerably small difference between charge and discharge voltages as compared to lithium, thus having a problem in that Li dendrites are readily produced by electrochemical reaction or overvoltage or polarization occurring in devices.

Also, a great amount of byproducts generated by side reactions are accumulated near generated dendrites and deterioration in cycle functions and in serious cases, byproducts pass through the separator, thus causing micro short-circuit and explosion or the like.

Accordingly, many researches attempt to devise methods for preventing formation of Li dendrites, but cannot yet obtain results satisfying current circumstances requiring higher energy density.

DISCLOSURE

Technical Problem

Therefore, the present invention has been made to solve the above and other technical problems that have yet to be resolved.

As a result of a variety of extensive and intensive studies and experiments to solve the problems as described above, the present inventors discovered that when an anode for secondary batteries is fabricated using a combination of two types of anode active materials that have different charge/discharge voltage and particle hardness and satisfy specific particle conditions, surprisingly, the anode prevents lithium precipitation caused by overvoltage, improves ionic conductivity as well as electric conductivity and exhibits superior capacity and cycle characteristics. The present invention has been completed, based on this discovery.

Technical Solution

In accordance with one aspect of the present invention, provided is an anode comprising a combination of an anode active material having a relatively low charge/discharge voltage and a relatively low hardness (A) and an anode active material having a relatively high charge/discharge voltage and a relatively high hardness (B), wherein the anode active material (A) is surface-coated with carbon having a high hardness or a composite thereof, and a particle size of the anode active material (B) is smaller than a size of a space formed by the anode active materials (A) arranged in a four-coordination.

An electrode that prevents lithium precipitation caused by overvoltage, improves ionic conductivity as well as electric conductivity and exhibits superior capacity and cycle characteristics can be obtained by combining the anode active material having a relatively high charge/discharge voltage (B) which is sufficiently small to be incorporated in an empty space provided between the anode active materials having a relatively low charge/discharge voltage (A) with the anode active material (A).

The most important electrode properties are electric conductivity and ion conductivity enabling sufficient transfer of ions and electrons. These properties are closely related to cycle characteristics. In most cases, these properties are known to depend upon active material, or a combination of active material, conductive material and binder or the like. However, researchers of the present invention discovered that these properties may be changed depending on physical properties under the same composition.

More specifically, regarding electrodes for lithium secondary batteries, an anode is fabricated by mixing an active material with a binder, a conductive material and the like to prepare a mix slurry and coating a Cu-foil with the mix slurry.

In order to improve energy density and enhance electric conductivity and mechanical function to desired levels, an electrode rolling process is performed. At this time, rolling degree determines porosity. In general, porosity of the electrode is calculated by a thickness of rolled electrode, rather than rolling strength.

However, as a result of a variety of extensive and intensive studies and experiments, the present inventors found that uniformity of inner porosity is changed according to rolling strength under the same thickness of rolled electrode. When rolling is performed at a high strength in order to obtain uniform porosity, disadvantageously, the surface of the electrode has low ion conductivity due to low porosity and the inside thereof has low electric conductivity due to high porosity. This phenomenon is intensified as an active material becomes softer (that is, as hardness of particles becomes lower). When the active material is soft, it is difficult to transfer a force from an upper layer to a lower part. Consequently, this behavior causes considerable deterioration in cycle characteristics.

Accordingly, the anode of the present invention has a structure in which the active material having a relatively high hardness (B) is inserted into the active material having a relatively low hardness (A), thus providing an electrode that can be more easily rolled under the same rolling strength.

The anode active material having a relatively low hardness (A) may be damaged by the active material having a relatively high hardness (B) during rolling. In this case, the anode active material (A) is deformed and thus affects porosity.

Accordingly, in order to minimize this damage, the surface of the anode active material (A) is preferably coated with carbon having a high hardness or a composite thereof. The term "a high hardness" means that the hardness is high enough to avoid surface damage caused by the active material having a relatively high hardness (B) during the rolling process. The anode active material (A) preferably has a similar hardness to the anode active material (B). For this reason, if desired, both the anode active material (A) and the anode active material (B) may be coated with the carbon or a composite thereof. In this case, the two anode active materials have the same or similar surface hardness and thus prevent surface damage.

As described above, use of the anode active material (B) that has a smaller size than a size of a space formed by the anode active materials having a relatively low charge/discharge voltage and a relatively low hardness (A) arranged in a four-coordination, and has properties different from the anode active material (A), that is, the anode active material having a relatively high charge/discharge voltage and a relatively high hardness is preferred and the size thereof preferably satisfies the following equation, which is demonstrated through calculation and experimentation.

$$r \leq R*0.225$$

wherein R is a particle radius of an anode active material (A) and r is a particle radius of an anode active material (B).

When these size conditions are satisfied, an electrode that is well rolled at a constant rolling strength due to the reasons described above can be obtained. Also, lithium precipitation caused by overvoltage can be prevented or minimized by using the anode active material having a relatively high charge/discharge voltage (B).

In a preferred embodiment, the anode active material (A) exerts charge/discharge characteristics at 0.05 to 0.2V and the anode active material (B) exerts charge/discharge characteristics at 0.2 to 0.5V.

Also, there is no particular limitation as to the hardness of the anode active material (B) so long as the hardness of the anode active material (B) is higher than that of the anode active material (A). In an embodiment, the hardness of the anode active material (B) may be 1.2 to 5 times that of the anode active material (A).

Regarding an active material satisfying these conditions, preferably, the anode active material (A) is a graphite-based active material and the anode active material (B) is a carbon-based active material.

The graphite-based active material is commonly used as an anode active material and examples thereof include natural graphite, surface-treated graphite, artificial graphite and the like. These materials mostly have low oxidation/reduction levels. Accordingly, the overvoltage described above occurs and the materials are soft in terms of physical properties.

The carbon-based active material may be an incompletely graphitized carbon such as hard carbon or soft carbon. As compared to graphite, the carbon-based active material has a relatively high charge/discharge voltage and a relatively high hardness in terms of physical properties. For reference, there is much difficulty in using only the carbon-based active material due to high initial irreversibility and low capacity.

In a preferred embodiment, the anode active material (B) may be present in an amount of more than 0% through less than 30% with respect to the total weight of the active material.

When the anode active material (B) is present in an amount of 30%, capacity may decrease and the material (B) does not contribute to rolling at a constant rolling strength.

Due to the reason described above, the anode active material (B) is more preferably present in an amount of 0 to 20%, particularly preferably 1 to 10% with respect to the total weight of the active material.

The present invention provides an anode for secondary batteries comprising a combination of two types of anode active materials that have different charge/discharge voltages and different hardness, wherein, of the anode active materials, an anode active material having a relatively low hardness (A) is surface-coated with a material having 0.9 to 1.1 times the hardness of an anode active material having a relatively high hardness (B) and a particle size of the anode active material (B) is smaller than a size of a space formed by the anode active materials (A) arranged in a four-coordination.

When the hardness of the material coated on the anode active material (A) is excessively smaller than that of the anode active material (B), the material disadvantageously cannot exert effects of prevention of surface damage of the anode active material (A) during rolling. On the other hand, when the hardness of the material coated on the anode active material (A) is excessively larger than that of the anode active material (B), the anode active material (B) may be disadvantageously surface-damaged during rolling.

For the reasons described above, the material coated on the anode active material (A) preferably has the same hardness as the anode active material (B) and is most preferably the same material as the anode active material (B).

In an embodiment, the anode for secondary batteries comprises a combination of two types of anode active materials that have different charge/discharge voltages and different hardness, wherein, of the anode active materials, an anode active material having a relatively low hardness (A) is surface-coated with carbon or a composite thereof, and a particle size of an anode active material having a relatively high hardness (B) is $(2^{1/2}-1)$ times or less that of the anode active material (A).

When the particle size ratio defined above exists between these active materials, the anode active material (B) is preferably disposed between the anode active materials (A) and an electrode having a lower porosity can be thus fabricated at the same pressure.

Also, the present invention provides an anode for secondary batteries comprising a combination of two types of anode active materials that have different charge/discharge voltages and different hardness, wherein of the anode active materials, an anode active material having a relatively low hardness (A) is surface-coated with a material having 0.9 to 1.1 times the hardness of an anode active material having a relatively high hardness (B), and a particle size of the anode active material (B) is $(2^{1/2}-1)$-times or less that of the anode active material (A).

The anode according to the present invention is fabricated by applying an anode material comprising the combination of active materials and a binder to an electrode current collector, followed by drying and pressing. If desired, the anode material may further comprise components such as a conductive material and filler.

An anode current collector is generally fabricated to have a thickness of 3 to 500 μm. Any anode current collector may be used without particular limitation so long as it has suitable conductivity without causing adverse chemical changes in the manufactured battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collectors, the current collectors include fine irregularities on the surface thereof so as to enhance adhesion to electrode active materials. In addition, the anode current collector may be used in various forms including films, sheets, foils, nets, porous structures, foams and non-woven fabrics.

Examples of the binder include polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrrollidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohol.

The conductive material may be used without particular limitation so long as it has suitable conductivity without causing adverse chemical changes in the battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

If desired, a filler is optionally added to inhibit expansion of the anode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Other components such as a viscosity controller or adhesion promoter may be optionally added singly or in combination of two or more types.

The viscosity controller is a component to control the viscosity of the electrode mix and thereby facilitate mixing of the electrode mix and application of the same to a current collector, and is present in an amount of 30% by weight or less, based on the total weight of the anode mix. Examples of the viscosity controller include, but are not limited to, carboxymethyl cellulose and polyvinylidene fluoride. In some cases, the aforementioned solvent may also act as the viscosity controller.

The adhesion promoter is an auxiliary ingredient to improve adhesion of an active material to a current collector, is present in an amount of 10% by weight, based on the binder and examples thereof include oxalic acid, adipic acid, formic acid, acrylic acid derivatives and itaconic acid derivatives.

Also, the present invention provides an anode for secondary batteries in which the anode mix is applied to a current collector.

The lithium secondary battery has a structure in which a lithium salt-containing non-aqueous electrolyte is impregnated into an electrode assembly comprising a separator interposed between the cathode and the anode.

For example, the cathode is prepared by applying a cathode active material to a cathode current collector, followed by drying and pressing, and further optionally comprises other components such as binder or conductive material described above associated with the configuration of the anode.

The cathode current collector is generally manufactured to have a thickness of 3 to 500 μm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. Similar to the anode current collector, the cathode current collectors include fine irregularities on the surface thereof so as to enhance adhesion to the cathode active material. In addition, the cathode current collector may be used in various forms including films, sheets, foils, nets, porous structures, foams and non-woven fabrics.

Any cathode active material may be used without particular limitation so long as it is capable of intercalating and deintercalting lithium during charge/discharge. Examples of the cathode active material include lithium cobalt oxide, lithium nickel oxide, lithium manganese oxide, lithium cobalt-manganese oxide, lithium cobalt-nickel oxide, lithium nickel-manganese oxide, lithium nickel-manganese-cobalt oxide, lithium iron-phosphate oxide and the like, and materials containing transition metals substituted by aluminum, magnesium, titanium and the like.

The binder, the conductive material and optionally added filler are described above associated with the anode.

The separator is interposed between the cathode and the anode. As the separator, an insulating thin film having high ion permeability and mechanical strength is used. The separator typically has a pore diameter of 0.01 to 10 μm an d a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

Where appropriate, a gel polymer electrolyte may be coated on the separator in order to improve battery stability. Representative examples of the gel polymer may include polyethylene oxide, polyvinylidene fluoride and polyacrylonitrile. When a solid electrolyte such as a polymer is used as the electrolyte, the solid electrolyte may also serve as a separator.

The lithium salt-containing non-aqueous electrolyte is composed of a non-aqueous electrolyte and lithium.

Examples of the non-aqueous electrolyte include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxo lane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the non-aqueous electrolyte include organic solid electrolytes such as polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the non-aqueous electrolyte include inorganic solid electrolytes such as nitrides, halides and sulphates of lithium such as $Li_3N$, $LiI$, $Li_5NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$ and $Li_3PO_4—Li_2S—SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, the non-aqueous electrolyte may further comprise halogen-containing solvents such as carbon tetrachloride and ethylene trifluoride in order to impart incombustibility, and may further comprise carbon dioxide gas in order to improve high-temperature storage characteristics.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of cyclic carbonate such as EC or PC as a highly dielectric solvent and linear carbonate such as DEC, DMC or EMC as a low-viscosity solvent.

The secondary batteries according to the present invention may be used for battery cells as power sources of small-sized devices, as well as unit batteries of middle- or large-sized battery modules comprising a plurality of battery cells used as power sources of middle- or large-sized devices requiring high-temperature stability, long cycle characteristics and high rate characteristics.

Preferably, examples of middle- or large-sized devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooters); electric golf carts and the like.

BEST MODE

Now, the present invention will be described in more detail with reference to the following examples. These examples are provided only for illustrating the present invention and should not be construed as limiting the scope and spirit of the present invention.

Example 1

A graphite-based anode active material (A) having a mean diameter of about 20 μm and surface-coated with carbon, and a carbon-based anode active material (B) having a mean diameter of about 4 μm were mixed at a weight ratio of A:B=95:5 to prepare a mixed anode active material. The mixed anode active material, SBR and CMC were mixed at a weight ratio of anode active material:SBR:CMC of 97.0:1.5:1.5 to prepare a slurry and the slurry was applied to a Cu-foil to fabricate an electrode. The electrode thus obtained was rolled at porosities of 23% and 28% and then punched to fabricate a coin-type half cell. The electrolyte used for the cell was an electrolyte of 1M $LiPF_6$ in a carbonate solvent.

Example 2

A coin-type half cell was fabricated in the same manner as Example 1, except that the anode active material (A) and the anode active material (B) were mixed at a weight ratio of A:B of 90:10.

Comparative Example 1

A coin-type half cell was fabricated in the same manner as Example 1, except that the anode active material (B) was not used.

Comparative Example 2

A coin-type half cell was fabricated in the same manner as Example 1, except that a carbon-based material having a mean diameter of about 15 μm was used as the anode active material (B).

Comparative Example 3

A coin-type half cell was fabricated in the same manner as Example 1, except that the anode active material (A) and the anode active material (B) were mixed at a weight ratio A:B of 60:40.

Experimental Example 1

Charge/discharge properties were evaluated for the half cells fabricated in accordance with Examples 1 and 2, and Comparative Examples 1 to 3. Specifically, during charge, the half cells were charged in a CC mode at a current density of 0.1 C to 5 mV and then maintained in a CV mode at 5 mV, and charging was completed when current density reached 0.01 C. During discharge, the cells were discharged in a CC mode at a current density of 0.1 C to 1.5V. As a result, a first cycle charge/discharge capacity and efficiency were obtained. The results are shown in Table 1 below. Then, charge/discharge was repeated 50 times under the same conditions as above, except that the current density was changed to 0.5 C. The results are shown in Table 2 below.

TABLE 1

|  |  | Ex. 1 | Ex. 2 | Comp. Ex. 1 | Comp. Ex. 2 | Comp. Ex. 3 |
|---|---|---|---|---|---|---|
| Porosity 28% | Charge capacity (mAh/g) | 380.7 | 376.2 | 385.2 | 376.3 | 342.1 |
|  | Discharge capacity (mAh/g) | 355.2 | 350.0 | 360.2 | 350.1 | 310.4 |
|  | Discharge capacity (mAh/cm$^3$) | 555.9 | 546.0 | 565.5 | 546.2 | 474.9 |
|  | Efficiency (%) | 93.3 | 93.0 | 93.5 | 93.0 | 90.7 |
| Porosity 23% | Charge capacity (mAh/g) | 382.1 | 377.2 | 387.5 | 378.3 | 347.8 |
|  | Discharge capacity (mAh/g) | 355.0 | 349.7 | 358.4 | 348.2 | 305.6 |
|  | Discharge capacity (mAh/cm$^3$) | 593.9 | 584.0 | 598.5 | 581.5 | 501.2 |
|  | Efficiency (%) | 92.9 | 92.7 | 92.5 | 92.0 | 87.9 |

As can be seen from Table 1 above, Comparative Examples 1 to 3 exhibited a decrease in efficiency of 1% or more when porosity was changed from 28% to 23%. The reason for this is that the surface of the anode active material is damaged as rolling is intensified in order to reduce porosity. However, in Examples 1 and 2 of the present invention in which a particle diameter of the anode active material (B) is smaller than a size of a space formed by the anode active materials (A) arranged in a four coordination, decreases in discharge capacity and efficiency were extremely small, although the porosity of the electrode was changed from 28% to 23%. The reason for this is that since the anode active material (B) is preferably positioned in a space provided between the anode active materials (A), the mixed active materials of Examples 1 and 2 require a relatively low pressure in order to obtain the same porosity, surface damage of the active material is small and decreases in capacity and efficiency are thus small.

Also, in Comparative Example 3 in which the anode active material (B) is mixed in an amount of 40%, discharge capacity is considerably low, a content of the anode active material having a relatively high hardness (B) is high and damage of anode active material caused by rolling cannot be sufficiently prevented.

For reference, in Comparative Example, there was an attempt to fabricate an electrode using only the anode active material (B), but fabrication of the electrode having the porosity was impossible due to high hardness.

TABLE 2

|  | Ex. 1 | Ex. 2 | Comp. Ex. 1 | Comp. Ex. 2 | Comp. Ex. 3 |
|---|---|---|---|---|---|
| Capacity efficiency (maintenance) after 50 charge/discharge cycles (%) | 90 | 92 | 73 | 85 | 75 |

As can be seen from Table 2 above, Examples 1 and 2 according to the present invention, in which a particle diameter of the anode active material (B) is smaller than a size of a space formed by the anode active materials (A) arranged in a four coordination, exhibited considerably superior capacity efficiency after 50 charge/discharge cycles, as compared to the comparative Examples.

As described above, the reason is that side-reactions with electrolyte according to charge/discharge are reduced, since surface damage of the active material caused by rolling is small. Also, effects such as prevention of lithium precipitation and improvement of ion conductivity can be obtained by mixing with a material a having high charge/discharge voltage.

INDUSTRIAL APPLICABILITY

As apparent from the fore-going, the anode active material of the present invention comprises a combination of two types of anode active materials that have different charge/discharge voltage and particle hardness and satisfy specific particle conditions, thus providing a secondary battery that prevents lithium precipitation caused by overvoltage, improves ionic conductivity as well as electric conductivity and exhibits superior capacity and cycle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An anode for secondary batteries comprising a combination of an anode active material having a relatively low charge/discharge voltage and a relatively low hardness (A) and an anode active material having a relatively high charge/discharge voltage and a relatively high hardness (B),
   wherein the anode active material (A) is surface-coated with carbon having a high hardness or a composite thereof, and a particle size of the anode active material (B) is smaller than a size of a space formed by the anode active materials (A) arranged in a four-coordination,
   wherein the anode active material (B) is a carbon-based active material, and
   wherein the anode active material (B) is positioned in a space provided between the anode active materials (A) arranged in a four-coordination.

2. The anode according to claim 1, wherein the anode active materials (A) and (B) satisfy the following equation:

$$r \leq R * 0.225$$

wherein R is a particle radius of an anode active material (A) and r is a particle radius of an anode active material (B).

3. The anode according to claim 1, wherein the anode active material (A) has a charge/discharge voltage at 0.05 to 0.2V and the anode active material (B) has a charge/discharge voltage at 0.2 to 0.5V.

4. The anode according to claim 1, wherein the hardness of the anode active material (B) is 1.2 to 5 times that of the anode active material (A).

5. The anode according to claim 1, wherein the anode active material (A) is a graphite-based active material.

6. The anode according to claim 1, wherein the anode active material (B) is present in an amount of more than 0% through less than 30%, with respect to the total weight of the active material.

7. An anode for secondary batteries comprising a combination of two types of anode active materials that have different charge/discharge voltages and different hardness, wherein, of the anode active materials, an anode active material having a relatively low hardness (A) is surface-coated with a material having 0.9 to 1.1 times the hardness of an anode active material having a relatively high hardness (B), and a particle size of the anode active material (B) is smaller than a size of a space formed by the anode active materials (A) arranged in a four-coordination,
  wherein the anode active material (B) is a carbon-based active material, and
  wherein the anode active material (B) is positioned in a space provided between the anode active materials (A) arranged in a four-coordination.

8. The anode according to claim 7, wherein the material coated on the anode active material (A) has the same hardness as the anode active material (B).

9. An anode for secondary batteries comprising a combination of two types of anode active materials that have different charge/discharge voltages and different hardness, wherein, of the anode active materials, an anode active material having a relatively low hardness (A) is surface-coated with carbon or a composite thereof, and a particle size of an anode active material having a relatively high hardness (B) is $(2^{1/2}-1)$ times or less that of the anode active material (A),
  wherein the anode active material (B) is a carbon-based active material, and
  wherein the anode active material (B) is positioned in a space provided between the anode active materials (A) arranged in a four-coordination.

10. An anode for secondary batteries comprising a combination of two types of anode active materials that have different charge/discharge voltages and different hardness, wherein, of the anode active materials, an anode active material having a relatively low hardness (A) is surface-coated with a material having 0.9 to 1.1 times the hardness of an anode active material having a relatively high hardness (B), and a particle size of the anode active material (B) is $(2^{1/2}-1)$-times or less that of the anode active material (A),
  wherein the anode active material (B) is a carbon-based active material, and
  wherein the anode active material (B) is positioned in a space provided between the anode active materials (A) arranged in a four-coordination.

11. A lithium secondary battery comprising the anode according to claim 1.

12. A middle- or large-sized battery pack comprising the lithium secondary battery according to claim 11 as a unit battery.

13. A lithium secondary battery comprising the anode according to claim 7.

14. A lithium secondary battery comprising the anode according to claim 9.

15. A lithium secondary battery comprising the anode according to claim 10.

* * * * *